March 29, 1949.  N. A. DYSART  2,465,435
TIRE PRESSURE INDICATOR
Filed Dec. 9, 1946
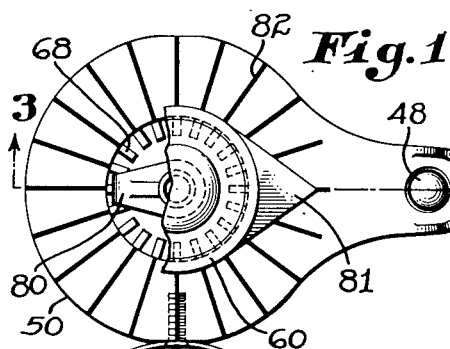
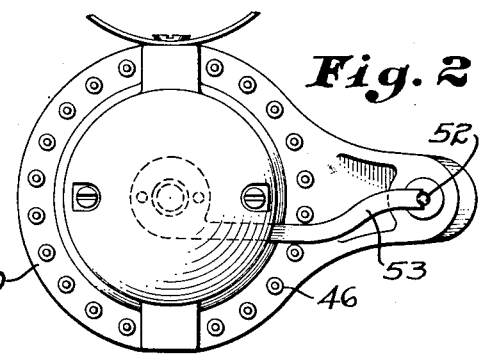
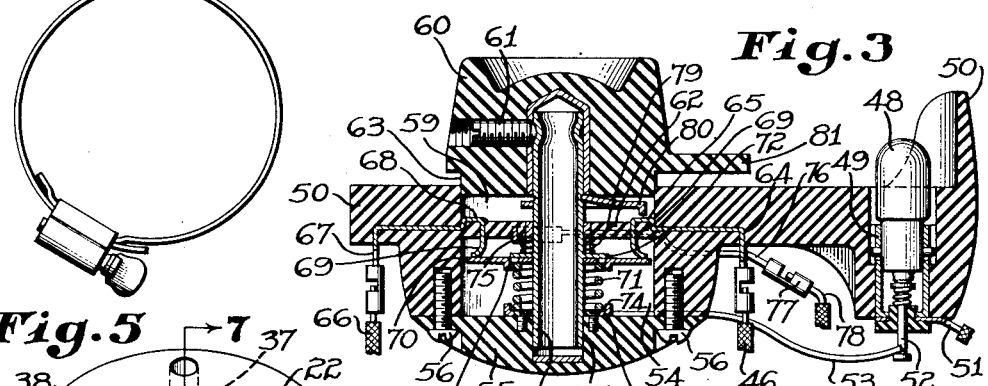
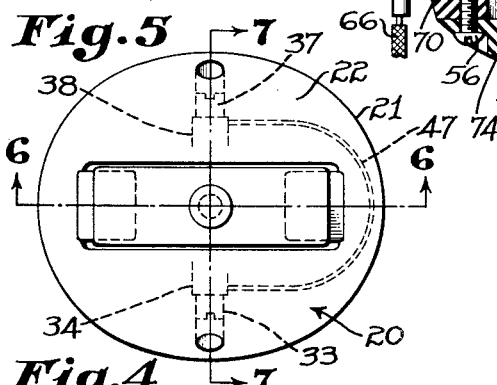
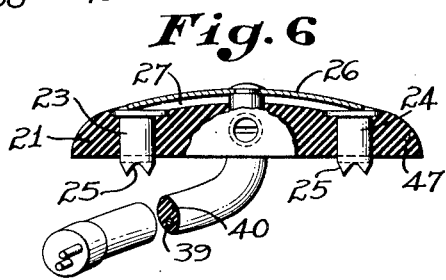
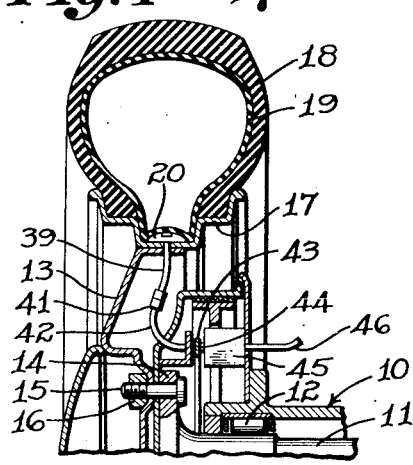
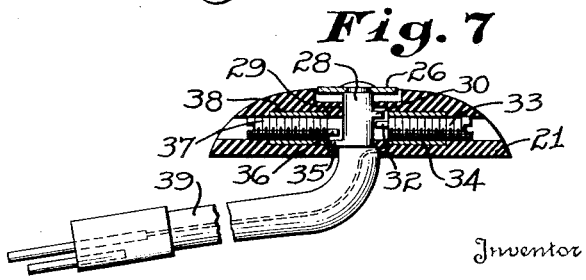
Inventor
Norman A. Dysart
By Lyon & Lyon
Attorneys Patented Mar. 29, 1949

2,465,435

UNITED STATES PATENT OFFICE 2,465,435

TIRE PRESSURE INDICATOR

Norman A. Dysart, Mobeetie, Tex., assignor, by mesne assignments, to Tire-Tell Corporation, Amarillo, Tex., a corporation of Texas Application December 9, 1946, Serial No. 715,081

7 Claims. (Cl. 201—48)

This invention relates to a tire pressure indicator and is directed to improvements over the structure illustrated in my copending application Serial No. 685,020, filed July 20, 1946, issued as Patent No. 2,447,689 on August 24, 1948.

The principal object of this invention is to provide an improved device for indicating on a dashboard or control panel the pneumatic pressure existing within a wheel-mounted tire on the vehicle.

Another important object is to provide an improved form of switch element to be inserted between the wheel rim and the inner tube of the pneumatic tire.

A further object is to provide a tire pressure indicating device of this type employing a single electric lead wire communicating with the switch element for indicating over-pressure, under-pressure or pressure within the permitted range.

Another object is to provide a unitary device for installation on a control panel or dashboard of a vehicle, such as an automobile, truck, tractor or airplane, which will indicate when the pressure within the pneumatic tires of the vehicle deviates from an acceptable range, and which is operable to indicate which of the various tires is so affected and whether the pneumatic pressure is too high or too low.

Another object is to provide such a device which is capable for use on vehicles having a relatively large number of pneumatic tires and yet which is simple in construction and operation and economical to manufacture and install.

Various other objects and advantageous features of this invention may be had from the following description, and one embodiment thereof may be seen in the accompanying drawings wherein similar characters of reference designate corresponding parts, and wherein:

Figure 1 is a plan view of an indicating apparatus employed in connection with a preferred embodiment of my invention;

Figure 2 is a view of the underside of the device shown in Figure 1;

Figure 3 is a sectional elevation taken substantially on the lines 3—3 as shown in Figure 1;

Figure 4 is a partial sectional elevation of a pneumatic tire and tube mounted on a rotatable wheel and showing the installation of the improved switch element comprising a part of the preferred embodiment of my invention;

Figure 5 is a plan view of the switch element shown on an enlarged scale;

Figure 6 is an elevation view partly in section along the lines 6—6 as shown in Figure 5; and Figure 7 is a sectional view taken substantially on the line 7—7 as shown in Figure 5.

Referring to the drawings, a vehicle (not shown) provided with an axle housing 10 may support a rotary axle 11 by means of the bearing assembly 12. The wheel member 13 may be secured to the flange 14 on the axle 11 by means of the threaded elements 15 and 16.

The wheel member 13 carries a rim 17 which may be of any convenient or desired type, such as, for example, a drop-center rim and a pneumatic tire 18 is mounted on the wheel rim 17 in the customary fashion. The usual inner tube 19 is provided within the tire 18 and a portion of the tube 19 contacts the switch element 20 which is inserted between the inner tube 19 and the wheel rim 17.

The switch element 20 includes an electrically non-conductive body 21 generally oval in outline and having a curved, smooth upper surface 22 substantially free from projections. Spaced pneumatic pins 23 and 24 are mounted in the body 21 and are provided with sharp teeth 25 at their lower ends for engaging the wheel rim 17 to form an electric connection to ground. A leaf spring element 26 has its opposite ends in contact with the pins 23 and 24 and is mounted in a recess 27 formed in the upper curved surface of the body 21.

Centrally mounted on the spring element 26 and secured thereto is a switch member 28 adapted for sliding movement within a bore 29 formed in the body 21. A lateral projection 30 on the switch member 28 is adapted to contact an eccentric pin 32 carried on the end of the adjusting screw 33 when the pneumatic pressure in the tube is sufficiently great to move the switch member 28 downwardly against the resilience of the spring element 26. The adjusting screw 33 is threaded within a metallic sleeve 34 fixed within the body 21. Similarly, a lateral projection 35 on the member 28 is adapted to contact an eccentric pin 36 on the adjusting screw 37 when the pneumatic pressure within the tube 19 relaxes sufficiently to permit the resilience of the spring element 26 to raise the member 28. The adjusting screw 37 is threadedly received within a metallic sleeve 38 fixed within the body 21.

A single electrical lead wire 39 enclosed within insulation 40 is connected to the sleeve 34, as shown in Figure 7. This electrical lead 39 is connected by the separable connector 41 to a wire 42 leading to the collector ring 43. The ring 43 is mounted coaxially of the axle 11 but is insulated from the wheel and wheel rim and connected only to the wire 42. The ring 43 rotates with the wheels 13. A non-rotary shoe 44 extending from a stationary housing 45 establishes an electrical connection between the rotary ring 43 and the stationary electrical lead 46.

The adjusting screws may be turned to position the eccentric pins 32 and 36 so that when the desired pneumatic pressure exists within the tube 19, the switch member 28 is in the position shown in Figure 7, and neither of the pins 32 or 36 is in contact with the element 28.

When the pneumatic pressure within the tube exceeds a predetermined value, the switch member 28 is depressed to bring the lateral projection 30 into contact with the eccentric pin 32, thereby establishing an electrical connection between the lead 39 and the electrical ground through the pins 23 and 24 to the rim 19.

A resistance wire 47 may be embedded within the body 21 to form an electrical connection between the sleeves 34 and 38. When the pressure within the pneumatic tube falls below a predetermined value, the projection 35 engages the eccentric pin 36 to establish an electrical connection between the sleeve 38 and the electrical ground through the pins 23 and 24. Since the sleeve 38 is connected by the resistance wire 47 to the sleeve 34, electrical energy flowing in the lead 39 loses a portion of its voltage in the resistance wire 47 before returning to ground through the pins 23 and 24. For example, if six volts above ground are applied to the electrical lead 39, very low voltage drop will occur when the elements 30 and 32 form a connection to ground, but a substantial voltage drop (for example two volts) will occur when the elements 35 and 36 establish a connection to ground. The importance of this distinction will appear more fully hereinafter.

The indicating device illustrated in Figures 1, 2 and 3 may be mounted on the dashboard or control panel of the vehicle and is provided with any desired type of signal means such as, for example, the red light 48. The light 48 is received within a bayonet-type socket 49 within the electrically, non-conductive housing 50. The socket 49 is connected to the hot side of the battery (not shown) via the lead wire 51. The other terminal of the light 48 is connected to the spring-biased plunger 52 which in turn is attached to an insulated lead 53 extending into a central cavity 54 provided in the housing 50.

A stationary cap 55 of electrically non-conductive material is removably attached to the housing 50 by means of machine screws 56. A recess 57 formed centrally of the cap 55 is adapted to receive the lower end of an electrically conductive distributor 58. The distributor 58 is generally tubular in shape and extends from the recess 57 centrally through the recesses 54 and 59 and is anchored to the non-conductive selection knob 60 by means of the set screw 61. A partition 62 formed integrally with the body 50 separates the recesses 54 and 59. The knob 60 is provided with a cylindrical portion 63 adapted to be received within the recess 59 and to permit relative rotary and longitudinal movement of the knob 60 with respect to the housing 50.

As shown in Figure 2, space is provided for a relatively large number of electrical lead wires, one from each of the pneumatic tires employed on the vehicle. Thus, as shown in the drawings, as many as twenty pneumatic tires might be employed in connection with the particular apparatus illustrated.

The particular lead wire 46 shown in Figure 4 may be connected to the terminal 64, as shown in Figure 3. The terminal 64 is electrically connected to an exposed wire 65 of relatively short length positioned radially of the distributor 58 and mounted within the upper recess 59. Likewise each of the other lead wires, such as the lead wire 66 connected to the terminal 67, is provided with a short length of exposed wire 68 mounted within the upper recess 59. A downwardly extending portion 69 on each of the exposed wires passes through the partition 62 and into the lower recess 54. The lower end of each of the wires 69 may be curved outwardly as shown to provide a resilient contact with the metallic plate 70. A compression spring 71 mounted in the lower recess 54 and encircling a portion of the distributor 58 maintains the plate 70 in contact with all twenty of the depending wires 69. A flange 72 formed on the distributor 58 limits upward movement of the plate 70. A metallic contact ring 73 provides an electrical connection between the distributor 58 and the lead wire 53 which extends into the lower recess 54. The contact ring 73 and plate 70 are each provided with projections 74 for maintaining the spring 71 in coaxial relationship with the distributor 58.

A secondary contact ring 75 is mounted on the partition 62 and is electrically connected to the lead wire 76 extending outside of the body 50. The connector element 77 connects the lead 76 to the ground wire 78. A supplementary spring 79 encircles the distributor 58. This supplementary spring 79 is of the compression type and contacts the partition 62 at its upper end and the flange 72 at its lower end.

In operation the electrical energy supplied through the leads 51 and 78 keeps the ring 73 and contact piece 75 at the potential of the battery. The distributor 58 is therefore likewise maintained at the battery potential and therefore each of the twenty exposed wires 69 and its associated connection to the switch elements 20 in the various wheels are also directly connected to the hot side of the battery. In the event that all of the tires carry the correct pneumatic pressure within the allowed range, none of the electric switches 20 is closed. In such event, the parts of the switch are in the position shown in Figure 7.

If the pneumatic pressure within one of the tubes 19 should fall below the pressure range allowed, the resilience of the spring element 26 associated with the switch in that wheel rim would raise the switch member 28 to bring the contacts 35 and 36 into engagement, thus establishing a connection to the electrical ground of the wheel rim 17 through the resistance wire 47. If the resistance of the wire 47 causes a potential drop of two volts, only four volts is available for illumination of the lamp 48 and hence it glows but not brightly.

The operator is thus made aware that in some one of the tires of the vehicle a low pressure exists. Such information might be extremely valuable on long hauls up a grade. One flat tire out of twenty on a heavy duty truck and trailer installation might not be noticed by the operator until the tire had heated up to the point where fire might occur. Instances are known where a valuable truck or trailer and its contents have been completely destroyed by fire originating at a low pressure tire.

An indication that pressure within a pneumatic tire is below the normal range might also be valuable to the pilot of an aircraft and enable him to avoid damage to the aircraft in attempting to land on a flat tire. In such event, landing on one wheel or a belly landing might even be desirable.

The glow of the lamp 48 indicates that one of the various pneumatic tires is under inflated, but no indication is given as to which tire is involved. In order to determine this, the operator grasps the knob 60 manually and depresses it, compressing the spring 71 and moving the plate 70 out of contact with the exposed wires 69. This causes the lamp 48 to be extinguished. The knob 60 is then rotated in its depressed position until the metallic finger 80 which is attached to the distributor 58 contacts the particular wire section 65 which is connected to the under inflated tire. Since the switch element on that tire has established a connection to ground through the resistance wire 47, the contact between the finger 80 and the exposed wire 65 will establish an electrical connection which will again cause the light to glow but not at its maximum brilliance. The pointer 81 on the knob 60 identifies the offending wheel. Indicator lines 82 may be provided on the upper surface of the housing 50 for cooperation with the pointer 81 to indicate the various pneumatic tires on the vehicle.

At this stage of the operation the operator has determined that one of the tires is either over inflated or under inflated and by depressing the knob and rotating it until the lamp 48 again glows, he has established which one of the tires is involved. The operator may be able visually to distinguish the relative brilliance of the bulb when lighted by four and six volts, but in the event that any doubt is present, the operator pulls upwardly on the knob 60 a sufficient distance to engage the flange 72 with the contact piece 75. By this action the lamp 48 is caused to glow at its maximum brilliance since it is connected to the battery by the lead 51 and is grounded through the members 53, 73, 58, 72, 75, 76 and the ground wire 78. If the lamp 48 glows with greater brilliance when the knob 60 is elevated, the operator is notified that low pressure exists in the particular tire in question. If no change is observed in the brilliance of the lamp 48 when the knob 68 is elevated, it is apparent that excessive pressure exists in the tire. The reason for this is that excessive pressure brings the contact elements 30 and 32 into engagement and thus establishes a direct connection from ground to the hot wire 39 and the voltage drop of the resistance 47 is not involved.

From consideration of the above description it will be understood that only a single electrical lead wire is required for each of the pneumatic tired wheels of the vehicle and yet this single wire is capable of indicating to the operator of the vehicle whether the pressure in that tire is within the permitted range or whether it is too high or too low.

Under normal conditions of operation the signal lamp 48 does not glow. When it becomes energized it attracts the attention of the operator who then depresses the knob 60 and rotates it until the lamp 48 again glows. In order then to determine whether the pressure in the offending tire is too high or too low, the knob is elevated to its highest operative position. If the lamp glows with increased intensity, the pressure is below the permissible range. If the light intensity does not change when the knob 60 is elevated, the operator knows that the offending tire is operating at pressure above the desired range.

While I have illustrated connections for twenty tires, it is to be understood that a greater or lesser number may obviously be used.

Having fully described my invention, it is to be understood that I do not wish to be limited to the details herein set forth, but my invention is of the full scope of the appended claims.

I claim:

1. In a device for indicating variations from desired pressure existing within a wheel-mounted pneumatic tire, the combination of: a pressure-sensitive electric switch assembly associated with the pneumatic tire; said assembly including a non-conducting base adapted to be positioned between a wheel rim and a tire inner tube; a single electrical lead wire communicating with the switch assembly; means on the switch assembly adapted to establish an electrical ground connection to the wheel, the switch assembly including a movable switch member and relatively stationary contact means on said base adapted to establish a direct connection from the lead wire to the electrical ground; an electrical resistance element totally embedded within said non-conducting base; and additional contact means adapted to be engaged by said switch member to establish a connection to ground through the electrical resistance element.

2. In a device for indicating variations from desired pressure existing within a wheel-mounted pneumatic tire, the combination of: a pressure-sensitive electric switch assembly associated with the pneumatic tire; said assembly including a non-conducting base adapted to be positioned between a wheel rim and a tire inner tube; a single electrical lead wire communicating with the switch assembly; stationary means on the base forming an electrical ground connection to the wheel; the switch assembly including a movable switch member and relatively stationary contact means on said base adapted to establish a low resistance connection from the lead wire to the electrical ground; an electrical resistance element totally embedded within said non-conducting base; and additional contact means adapted to be engaged by said switch member to establish a high resistance connection to the electrical ground through the electrical resistance element.

3. In a device for indicating variations from desired pressure existing within a wheel-mounted pneumatic tire, the combination of: a pressure-sensitive electric switch assembly mounted on the wheel and associated with the pneumatic tire; said assembly including a non-conducting base adapted to be positioned between a wheel rim and a tire inner tube; a single electrical lead wire communicating with the switch assembly; stationary means on the base forming an electrical ground connection to the wheel; the switch assembly including a pressure-sensitive movable member on said base electrically connected to said stationary means; a first contact element connected directly to said single lead wire; an electrical resistance element totally embedded within said non-conducting base; and a separate contact element indirectly connected to the single lead wire through the electrical resistance element; the movable member being adapted to engage one of the contact elements in response to relatively low tire pressure and to engage the other of the contact elements in response to relatively high tire pressure.

4. In a device for indicating variations from desired pressure existing within a wheel-mounted pneumatic tire, the combination of: a pressure-sensitive electric switch assembly mounted on the wheel and associated with the pneumatic tire; said assembly including a non-conducting base adapted to be positioned between a wheel rim and a tire inner tube; a single electrical lead wire communicating with the switch assembly; stationary means on the base forming an electrical ground connection to the wheel; the switch assembly including a pressure-sensitive movable member electrically connected to said stationary means; a first contact element on the base connected directly to said single lead wire; an electrical resistance element totally embedded within said non-conducting base; a second contact element on the base indirectly connected to the single lead wire through the electrical resistance element; and means whereby the position of the contact elements may be independently adjusted relative to the movable member; the movable member being adapted to engage one of the contact elements in response to relatively low tire pressure and to engage the other of the contact elements in response to relatively high tire pressure.

5. In a device for indicating unit pressure existing within the inner tube of a wheel-mounted pneumatic tire, the combination of: a switch assembly adapted to be inserted between the wheel rim and the inner tube, said switch assembly having a non-conducting body provided with a set of electrical contact elements adapted to be brought into engagement in response to abnormally high pressure within the inner tube, and having a separate set of electrical contact elements adapted to be brought into engagement in response to abnormally low pressure within the inner tube, an electrical resistance element associated with said switch assembly and totally embedded within the base, a single electrical lead wire communicating with the switch assembly, one of the sets of contact elements acting to connect the lead wire directly to electrical ground and the other acting to connect the lead wire to ground via the electrical resistance element.

6. In a device for indicating unit pressure existing within an inner tube of a wheel mounted pneumatic tire, the combination of a switch assembly adapted to be mounted on the wheel rim adjacent the inner tube, a pressure-sensitive movable switch member extending into a cavity provided in the body, high pressure and low pressure electrical contacts each mounted within the body cavity and adapted to be engaged by said switch member at different points along its path of travel to complete an electrical circuit, means providing an electrical path between said contacts, said means including a non-variable resistor element mounted within said body, and an insulated electrical lead extending from one of said contact elements, the said contacts being individually adjustable along the path of travel of said switch member.

7. In a device for indicating unit pressure existing within an inner tube of a wheel mounted pneumatic tire, the combination of a switch assembly adapted to be mounted on the wheel rim adjacent the inner tube, a bowed leaf spring overlying a portion of the body, a switch member secured to the leaf spring at a position between its ends and extending into a cavity provided in the body whereby said switch member is movable in said cavity upon flexing of said spring, high pressure and low pressure electrical contacts each mounted within the body cavity and adapted to be engaged by said switch member at different points along its path of travel to complete an electrical circuit, means providing an electrical path between said contacts, said means including a non-variable resistor element mounted within said body, and an insulated electrical lead extending from one of said contact elements, the said contacts being individually adjustable along the path of travel of said switch member.

NORMAN A. DYSART.

REFERENCES CITED

The following references are of record in the file of this patent:

UNITED STATES PATENTS

| Number | Name | Date |
| --- | --- | --- |
| 1,140,937 | Ashelman et al. | May 25, 1915 |
| 1,658,666 | Burgener et al. | Feb. 7, 1928 |
| 1,683,343 | Gartner | Sept. 4, 1928 |
| 1,772,949 | Jaloby | Aug. 12, 1930 |
| 1,851,978 | Dinger | Apr. 5, 1932 |
| 1,984,084 | Rodney | Dec. 11, 1934 |
| 2,033,424 | Gieskieng | Mar. 10, 1936 |
| 2,135,303 | Greene | Nov. 1, 1938 |